March 21, 1933.  A. J. MEIER  1,901,978
MANUFACTURE OF POWDERS
Filed June 14, 1929
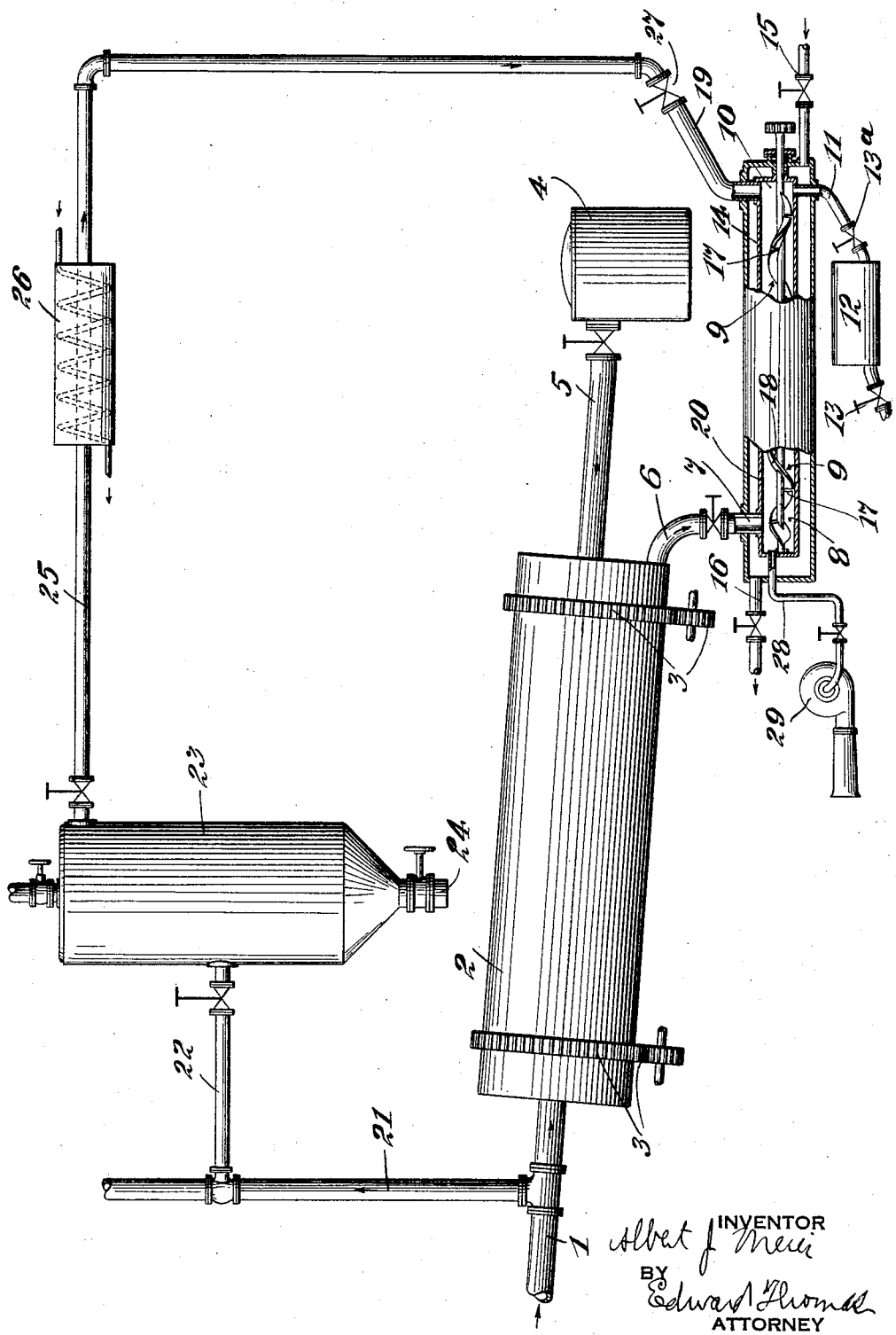
INVENTOR
Albert J Meier
BY Edward Thomas
ATTORNEY Patented Mar. 21, 1933

1,901,978

UNITED STATES PATENT OFFICE

ALBERT J. MEIER, OF GLENDALE, MISSOURI, ASSIGNOR TO THE NEW JERSEY ZINC COMPANY, OF NEW YORK, N. Y., A CORPORATION OF NEW JERSEY

MANUFACTURE OF POWDERS

Application filed June 14, 1929. Serial No. 370,799.

This invention relates to the manufacture of powders such as pigments and is herein illustrated as applied to the manufacture of lithopone.

It has been previously known that the best lithopone is manufactured by calcining the raw materials in an inert atmosphere, that is to say out of contact with air and that the best results are further assured by cooling lithopone down to normal temperatures while still excluding the air. It has been customary to effect this cooling by delivering the calcined material into water and then drying it. This procedure involved loss of material in the water or else required evaporation of large amounts of water to recover the material. Moreover the contaminated water might not be suitable for reuse.

According to the present invention the calcined material is cooled in a water-jacketed device, preferably one through which it is fed to a storage bin. The calcined material while thus fed is kept from contact with air in any suitable manner as by feeding it counter-current to a stream of carbon dioxide gas or in an atmosphere of $CO_2$ gas at plus pressure. Other features and advantages will hereinafter appear.

The accompanying drawing shows schematically one procedure for carrying out the invention.

The wet raw material is fed through a feed chute 1 into the usual rotary calcining furnace 2 which is provided with gears 3 and while travelling through the rotating kiln or furnace 2 is heated by gas coming from a water gas producer 4 which is carried through a conduit 5 to a burner not shown, accompanied by the proper amount of air in the usual manner.

The calcined material leaves the kiln 2 through a discharge chute 6, and, according to the present invention, is carried from the chute 6 through a continuation 7 into a water-jacketed chamber 8 forming the trough of a conveyor having a feeding spiral screw 9. The screw 9 is rotated by a drive, not shown, so as to feed the calcined material to the opposite end 10 of the chute 8, where it falls into a conveyor or chute 11 which delivers it into a storage bin 12. A valve 13 is provided so that the bin 12 may be temporarily shut off from the chamber 8 while being emptied by a second valve 13a.

The chamber 8 is preferably surrounded top and bottom by a double wall leaving a space 14 through which water flows, entering through a valved inlet 15 at the cool end of the container 8 and leaving through the upper and hot end 16 of the container. The water thus progressively cools the inflowing calcined material in counter-current fashion, and not being contaminated by the material is adapted to be used for any purpose as for boiler feed water.

The screw feed 9 instead of being continuous may be provided with a number of slots 17 cut in its thread 18 so that at the slots 17 the material is thoroughly stirred by the revolving screw.

In order to keep the air away from the material being cooled by the water a continuous stream of inert gas or an atmosphere of $CO_2$ gas at plus pressure is used as by causing gas to flow through an intake 19 into the upper part of the container 8 and passes over the flowing calcined material, preferably counter-current fashion, thus aiding the cooling by the water. To allow the maximum amount of gas to pass through the upper part wall 20 of the container 8 may lie considerably above the turns of the spiral thread 18, thus providing a free space for flow of the gas.

In the form of the invention herein illustrated the gas is obtained from the flue 21 of the kiln 2 by a conduit 22 leading into a carbon dioxide gas container adapted to draw the desired quantity of gas from the flue 21 by any suitable means, not shown. The container preferably separates the dust and discharges it at 24. The gas from the container 23 flows through a conduit 25 and if desired through a drying and cooling device 26 and past a valve 27 to the conduit 19.

To aid in the flow of gas through the container 8 the exit conduit 28 may be provided with a suction fan 29 adapted to draw the gas out of the container 8. The used gas may have its dust separated and be reused after cooling, or used for any other purpose desired.

Having thus described certain embodiments of the invention, what is claimed is:

1. The process of making a pigment which consists in calcining suitable material in a kiln out of contact with air, removing the calcined material out of contact with air, and while still out of contact with air cooling it with a stream of gas substantially non-reactive to the hot pigment which is brought in direct contact with the hot calcined material.

2. The process of making a pigment which consists in calcining suitable material in a kiln out of contact with air, removing the calcined material out of contact with air, and cooling the material while still out of contact with air by carrying it counter to a stream of cooling gas substantially non-reactive to the hot pigment which is brought in direct contact with the hot calcined material.

3. The combination with a kiln adapted to calcine material out of contact with air, of a cooling device including means for conveying the calcined material, and means for carrying a stream of cooling gas substantially free from air counter to the conveyed material including an inlet in the cooling device for the introduction of cooling gas and an outlet in the cooling device for the withdrawal of spent cooling gas.

4. The combination with a kiln adapted to calcine material out of contact with air, of a cooling device including a screw feeding member, and means for carrying a stream of cooling gas substantially free from air counter to the material fed by the screw, an inlet being provided at one end of the cooling device for the introduction of the cooling gas and an outlet at the other end of the cooling device for the withdrawal of spent cooling gas from the system.

5. The combination with a kiln adapted to calcine material out of contact with air, of a cooling device including a water-cooled trough, means for feeding material through the trough, and means for maintaining in the trough an atmosphere substantially free from air including an inlet at or near one end of the trough for the introduction of cooling gas and an outlet at or near the other end of the trough for the withdrawal of spent cooling gas.

6. The combination with a kiln adapted to calcine material out of contact with air, of a cooling device including a water-cooled trough, a screw for feeding calcined material through the trough, and means for feeding a cooling gas substantially free from air through the trough in the opposite direction including an inlet at or near one end of the trough for the introduction of cooling gas and an outlet at or near the other end of the trough for the withdrawal of spent cooling gas.

7. The method of treating calcined lithopone which comprises progressively moving calcined lithopone from a calcining chamber to a cooling chamber out of contact with air, and cooling the calcined lithopone in the cooling chamber in part at least by passing a stream of non-oxidizing cooling gas directly in contact with the hot lithopone.

8. The method of treating calcined lithopone which comprises progressively moving hot calcined lithopone that has been kept out of contact with air through a cooling chamber, and cooling the hot lithopone in the cooling chamber by passing a stream of non-oxidizing cooling gas countercurrently and in direct contact with the moving lithopone.

9. In an apparatus for the manufacture of lithopone, the combination comprising a calcining chamber, a cooling chamber, a closed conduit connecting the calcining chamber with the cooling chamber, said cooling chamber consisting of a water-jacketed trough provided with a feeding spiral screw, an inlet to one end of the trough for the introduction of cooling gas and an outlet at the other end of the trough for the withdrawal of spent cooling gas.

10. An apparatus according to the preceding claim, in which the outlet for the withdrawal of spent cooling gas connects with a suction device adapted to draw gas out of the trough.

11. The method of treating a calcined pigment which comprises progressively moving the calcined pigment from a calcining chamber to a cooling chamber out of contact with air, and cooling the calcined pigment in the cooling chamber in part at least by passing a stream of a cooling gas inert with respect to the pigment directly in contact with the hot pigment.

12. The method of treating a calcined pigment which comprises progressively moving the hot calcined pigment that has been kept out of contact with air through a cooling chamber and cooling the hot calcined pigment in the cooling chamber by passing a stream of cooling gas inert with respect to the pigment counter-currently and in direct contact with the moving pigment.

13. The method of treating a calcined pigment that is susceptible to oxidation which comprises progressively moving the calcined pigment from a calcining chamber to a cooling chamber out of contact with air, and cooling the calcined pigment in the cooling chamber in part at least by passing a stream of non-oxidizing cooling gas directly in contact with the hot calcined pigment.

14. The method of treating a calcined pigment that is susceptible to oxidation which comprises progressively moving the hot calcined pigment that has been kept out of contact with air through a cooling chamber, and cooling the hot calcined pigment in the cooling chamber by passing a stream of non-oxidizing cooling gas counter-currently and in direct contact with the moving pigment.

15. The method of treating a calcined pigment that contains zinc sulfide which comprises progressively moving the calcined pigment from a calcining chamber to a cooling chamber out of contact with air and cooling the calcined pigment in the cooling chamber in part at least by passing a stream of non-oxidizing cooling gas directly in contact with the hot pigment.

16. The method of treating a calcined pigment that contains zinc sulfide which comprises progressively moving the hot calcined pigment that has been kept out of contact with air through a cooling chamber and cooling the hot calcined pigment in the cooling chamber by passing a stream of non-oxidizing cooling gas counter-currently and in direct contact with the moving pigment.

ALBERT J. MEIER.